US010885282B2

(12) United States Patent
Ilić et al.

(10) Patent No.: US 10,885,282 B2
(45) Date of Patent: Jan. 5, 2021

(54) DOCUMENT HEADING DETECTION

(71) Applicant: Microsoft Technology Licensing, LLC, Redmond, WA (US)

(72) Inventors: Andreja Ilić, Belgrade (RS); Katarina Jovanović, Belgrade (RS); Miloš Rašković, Belgrade (RS); Vladimir Ranković, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 60 days.

(21) Appl. No.: 16/212,907

(22) Filed: Dec. 7, 2018

(65) Prior Publication Data

US 2020/0184013 A1    Jun. 11, 2020

(51) Int. Cl.
*G06F 17/20*   (2006.01)
*G06F 40/30*   (2020.01)
*G06F 40/211*  (2020.01)

(52) U.S. Cl.
CPC ............ *G06F 40/30* (2020.01); *G06F 40/211* (2020.01)

(58) Field of Classification Search
CPC ....... G06F 40/258; G06F 40/30; G06F 40/211
See application file for complete search history.

(56) References Cited

U.S. PATENT DOCUMENTS

| | | | |
|---|---|---|---|
| 6,298,357 B1 | 10/2001 | Wexler et al. | |
| 8,738,436 B2 * | 5/2014 | Tuladhar | G06Q 20/102 705/14.4 |
| 9,224,196 B2 * | 12/2015 | Duerksen | G06T 7/0002 |
| 9,946,690 B2 * | 4/2018 | Sesum | G06F 40/106 |
| 10,614,152 B2 * | 4/2020 | Livingston | G06F 40/103 |
| 10,741,093 B2 * | 8/2020 | Meisner | G09B 7/02 |
| 2009/0300046 A1 * | 12/2009 | Abouyounes | G06F 16/353 |
| 2010/0125570 A1 * | 5/2010 | Chapelle | G06F 16/951 707/722 |
| 2011/0270815 A1 * | 11/2011 | Li | G06F 16/24522 707/706 |
| 2012/0130705 A1 * | 5/2012 | Sun | G06F 40/40 704/9 |

(Continued)

OTHER PUBLICATIONS

"International Search Report and Written Opinion Issued in PCT Application No. PCT/US2019/063917", dated Mar. 17, 2020, 24 Pages.

*Primary Examiner* — Mohammed H Zuberi
(74) *Attorney, Agent, or Firm* — Merchant & Gould

(57) ABSTRACT

Document heading detection includes performing a classification on each of a plurality of paragraphs of a document to identify each paragraph as either a heading or non-heading paragraph. The classification is based on one or more pre-established values corresponding to one or more pre-established formatting features that are indicative of a heading paragraph relative to currently established values for each of the one or more pre-established formatting features in each of the plurality of paragraphs. Document heading detection further includes determining a strength of each of the one or more heading paragraphs by performing a linear regression on each heading paragraph and assigning each of the one or more heading paragraphs a heading level within a hierarchy of heading levels based on the determined strength.

20 Claims, 10 Drawing Sheets

(56) References Cited

U.S. PATENT DOCUMENTS

| | | | |
|---|---|---|---|
| 2013/0191389 A1* | 7/2013 | Lazarevic | G06K 9/00463 |
| | | | 707/737 |
| 2017/0010790 A1* | 1/2017 | Glover | G06F 3/14 |
| 2017/0277668 A1* | 9/2017 | Luo | G06F 16/345 |
| 2018/0039907 A1 | 2/2018 | Kraley | |
| 2018/0041530 A1* | 2/2018 | Tang | G06F 16/951 |
| 2018/0330202 A1 | 11/2018 | Blanchflower et al. | |
| 2019/0205385 A1* | 7/2019 | Gusakov | G06F 40/253 |
| 2019/0236132 A1* | 8/2019 | Zhu | G06N 20/20 |
| 2019/0266573 A1* | 8/2019 | Radhakrishnan | G06Q 10/1095 |
| 2019/0295544 A1* | 9/2019 | Garcia | G06F 40/30 |
| 2019/0340949 A1* | 11/2019 | Meisner | G06F 40/30 |

\* cited by examiner

| Syntactical Feature |
| --- |
| A. Part of a Bulleted List |
| B. Starts with a Number |
| C. Sentence Count |
| D. Word Count |
| E. Ends with a Colon |
| F. Percentage of Non-Alphanumeric Characters |
| G. Number of Tabs |
| H. Number of Empty Paragraphs Before |
| I. Number of Empty Paragraphs After |
| J. Ends with Punctuation |
| K. Text Length |
| L. Text Length Compared to Previous |
| M. Text Length Compared To Next |

Table C

| Relative Formatting Feature |
| --- |
| A. Different Color Than Next |
| B. Font Size Relative to Next |
| C. Normalized Font Size |
| D. Indentation Compared to Next |
| E. Indentation Compared to Previous |
| F. Normalized Indentation |
| G. Distance to Neighbors |
| H. Followed by Bulleted List |

Table B

| Direct Formatting Feature |
| --- |
| A. Bold |
| B. Italic |
| C. Underline |
| D. Uppercase |
| E. Font Size |
| F. Indentation |
| G. Outline Level |
| H. Alignment |

Table A

| Semantical Feature |
| --- |
| Term Frequency – Inverse Document Frequency |

Table D

FIG. 3

DOCUMENT HEADING DETECTION

BACKGROUND

The ability to convert a document from a first authoring application's format to a second authoring application's format is often a desirable and useful operation due to the vast number of authoring applications utilized by different users. In order to have a successful document conversion, a conversion tool needs to accurately identify the structural elements of the base document in the first format to create corresponding structural elements in the second format.

The identification of structural elements includes identifying titles and headings of a document. In the past, conversion tools have relied upon the ability to recognize predefined styles within a document to determine whether a block of text comprises a title or a heading. For example in MS WORD®, an author can apply a predefined "Heading 1" style to a block of text resulting in the block of text being formatted as a first-level heading with a particular font and justification. In another example, MS WORD provides a predefined "Heading 2" style for second level headings within a heading hierarchy, wherein the "Heading 2" style includes a different particular font and justification. Other predefined styles are also available.

However, statistics show that authors rarely use the available predefined styles of an authoring application to denote headings within a document. One study of numerous documents showed that only 14% of the documents actually used predefined heading styles within the document. Further, only 2% of the documents used heading styles appropriately; more often, the heading styles were used incorrectly (e.g. a user applies a "Heading 3" style to emphasize a "Heading 1" style paragraph). More commonly, authors simply apply direct formatting (e.g. increased font size, bolding of the font, changing the color of the font) to a block of text to denote a heading. As such, currently available conversion tools searching for predefined heading styles within a document will overlook those headings with direct formatting and will produce an inaccurate detection of heading paragraphs and, thereby, an inaccurate document conversion.

It is with respect to these and other general considerations to which the aspects disclosed herein are directed.

SUMMARY

This disclosure generally relates to systems and methods for detecting headings in a document; the detection of headings assists in the accurate conversion of a document from a first authoring application's format to a second authoring application's format and can also be used, for example, by an authoring application in the generation of a table of contents, a document outline, or a document navigational map/outline. Other uses of the detected headings are also possible. In certain aspects the systems and methods for detecting headings in a document are performed on a completed document while in other aspects the systems and methods for detecting headings occur in real time as a document is being created within an authoring application, e.g. the content of a document is continuously analyzed as new text is entered. The various aspects described herein perform document heading detection by analyzing content of a document for formatting features, syntactical features and/or semantical features. Once headings are detected, the headings are further analyzed through use of a linear regression to determine a strength of each heading based on a subset of the features and to assign a level to each heading based on the strength.

In one aspect, the present disclosure is directed to a method for detecting document headings. The method includes receiving a plurality of paragraphs in a document created with an authoring application, wherein each of the plurality of paragraphs includes textual content. The method further includes performing a classification on each of the plurality of paragraphs to identify each paragraph as either a heading paragraph or a non-heading paragraph. The classification is based on one or more pre-established values corresponding to one or more pre-established formatting features that are indicative of a heading paragraph relative to currently established values for each of the one or more pre-established formatting features in each of the plurality of paragraphs. The method further includes determining a strength of each of the one or more heading paragraphs. The strength is determined by performing a linear regression on each heading paragraph, wherein the linear regression is based on the currently established values associated with a subset of the one or more pre-established formatting features in each of the heading paragraphs. The method further includes assigning each of the one or more heading paragraphs a heading level within a hierarchy of heading levels based on the determined strength.

In another aspect, the present disclosure is directed to a system to detect document headings. The system includes a memory storing executable instructions and a processor. When executing the executable instructions, the processor is caused to receive a plurality of paragraphs in a document created with an authoring application, wherein each of the plurality of paragraphs includes textual content. The processor is additionally caused to perform a classification on each of the plurality of paragraphs to identify each paragraph as either a heading paragraph or a non-heading paragraph. The classification is based on one or more pre-established values corresponding to one or more pre-established direct formatting features that are indicative of a heading paragraph relative to currently established values (e.g., a value greater or less than the pre-established value) for each of the one or more pre-established direct formatting features in each of the plurality of paragraphs. The processor is additionally caused to determine a strength of each of the one or more heading paragraphs. The strength is determined by performing a linear regression on each heading paragraph. The linear regression is based on the currently established values associated with a subset of the one or more pre-established direct formatting features in each of the heading paragraphs. The processor is additionally caused to assign each of the one or more heading paragraphs a heading level within a hierarchy of heading levels based on the determined strength.

In yet another aspect, the present disclosure is directed to a computer storage media that stores computer-executable instructions. The instructions direct a computer to receive a plurality of paragraphs in a document created with an authoring application, wherein each of the plurality of paragraphs includes textual content. The instructions further direct the computer to perform a classification on each of the plurality of paragraphs to identify each paragraph as either a heading paragraph or a non-heading paragraph without regard to a predefined paragraph style assigned by the authoring application. The classification is based on one or more pre-established values corresponding to one or more pre-established paragraph features that are indicative of a heading paragraph relative to currently established values for each of the one or more pre-established paragraph features in each of the plurality of paragraphs. The instructions further direct the computer to determine a strength of each of the one or more heading paragraphs. The strength is determined by performing a linear regression on each heading paragraph. The linear regression is based on the currently established values associated with a subset of the one or more pre-established paragraph features in each of the heading paragraphs. The instructions further direct the computer to assign each of the one or more heading paragraphs a heading level within a hierarchy of heading levels based on the determined strength.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 3 is a listing of features that can be analyzed by the document heading detection tool to determine an existence and/or a level of a document heading.

DETAILED DESCRIPTION

In the following detailed description, references are made to the accompanying drawings that form a part hereof, and in which are shown by way of illustrations, specific aspects or examples. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, this disclosure generally relates to systems and methods for detecting headings in a document; the detection of headings assists in the accurate conversion of a document from a first authoring application's format to a second authoring application's format and can also be used, for example, by an authoring application in the generation of a table of contents, a document outline, or a document navigational map/outline. Other uses of the detected headings are also possible. In certain aspects the systems and methods for detecting headings in a document are performed on a completed document while in other aspects the systems and methods for detecting headings occur in real time as a document is being created within an authoring application, e.g. the content of a document is continuously analyzed as new text is entered. The various aspects described herein perform document heading detection by analyzing content of a document for formatting features, syntactical features and/or semantical features. Once headings are detected, the headings are further analyzed through use of a linear regression to determine a strength of each heading based on a subset of the features and to assign a level to each heading based on the strength.

The analysis performed by the systems and methods of the present disclosure, which rely on evaluating formatting features, syntactical features and semantical features of paragraphs of a document, are more likely to identify headings within the document than currently available document heading detectors that rely strictly on detection of predefined heading styles. As such, utilizing the system and method of the present disclosure is likely to result in a more accurate conversion of a document from a first authoring application format to a second authoring application format, a more accurate table of contents, a more accurate document outline and/or a more accurate document navigational map/outline than prior document heading detectors.

Figure 1:
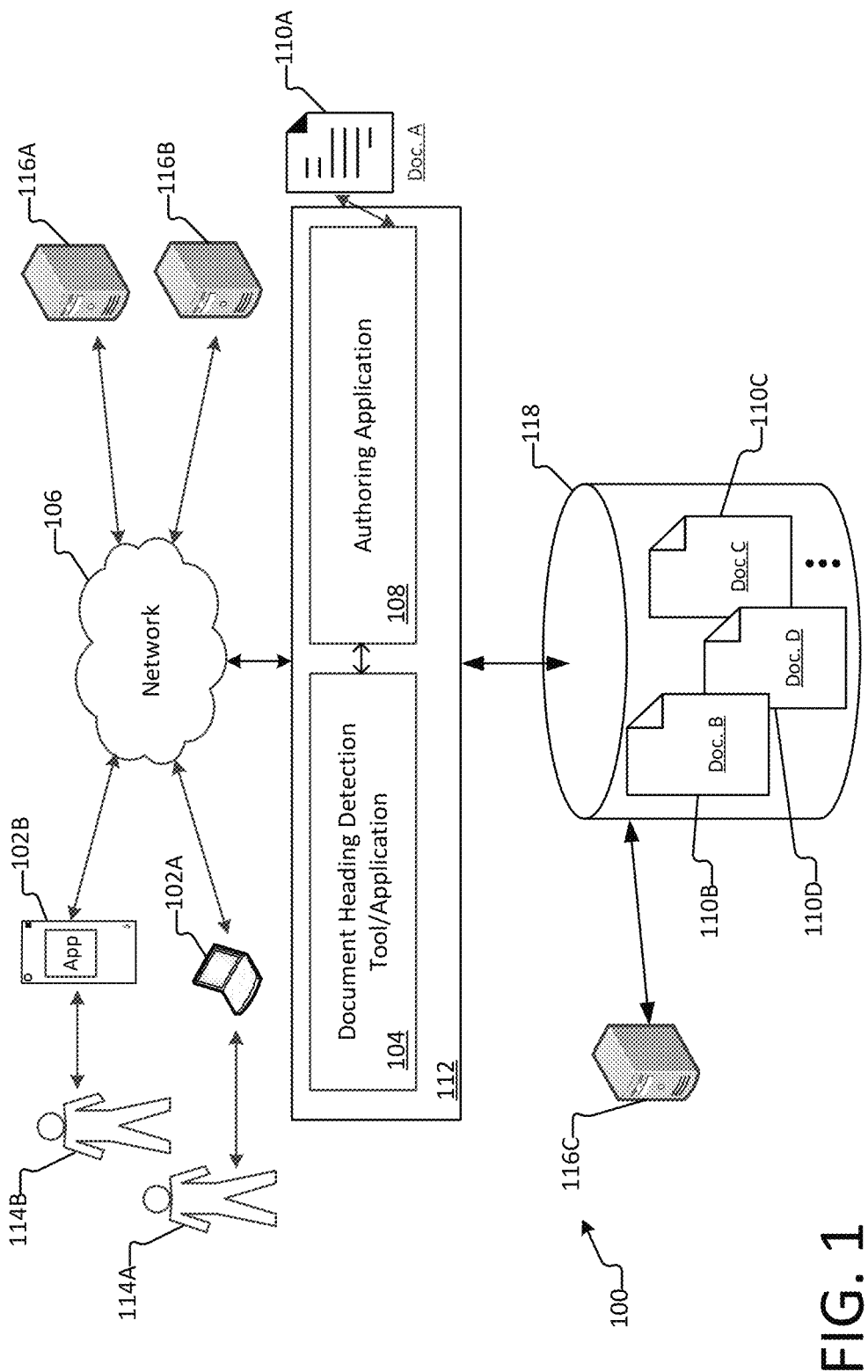
FIG. 1 is a system for utilizing a document heading detection tool.

FIG. 1 illustrates a system 100 for detecting headings in a document formatted according to a first authoring application.

As illustrated, system 100 can comprise one or more client computing devices 102 (e.g. client computing devices 102A and 102B) that can execute a client version of a document heading detection tool (or application) to identify headings and their level in a heading hierarchy. In some examples, the document heading detection tool 104 may execute locally on a client computing device 102. For example, the document heading detection tool (e.g. mobile app) can operate in communication (e.g., via network 106) with a corresponding server version of document heading detection tool 104 (alone or in conjunction with an authoring application 108 suitable for generating a document, e.g., document 110A) executing one or more server computing devices, e.g., server computing device 112. In still other configurations, rather than executing a client version of document heading detection tool, the one or more client computing device 102 can remotely access, e.g., via a browser over network 106, the document heading detection tool 104 (and/or the authoring application 108) implemented on the one or more server computing devices 112. As noted previously, the heading detection tool 104 can operate independently, or interface with the authoring application 108, to detect headings in an existing document 110A or in a document 110A currently be edited or created in real time with the authoring application 108.

In a basic configuration, the one or more client computing devices 102 are personal or handheld computers having both input elements and output elements operated by the one or more users 114 (e.g. user 114A and user 114B). For example, the one or more client computing devices 102 may include one or more of: a mobile telephone; a smart phone; a tablet; a phablet; a smart watch; a wearable computer; a personal computer; a desktop computer; a laptop computer; a gaming device/computer (e.g., Xbox); a television; and the like. This list is only and should not be considered as limiting. Any suitable client computing device for executing a heading detection tool 104 and/or remotely accessing heading detection tool 104 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 112 may communicate with some components of the system via a local network (e.g., an enterprise intranet), whereas server computing device 112 may communicate with other components of the system via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

As described above, the document heading detection tool 104 may be implemented on a server computing device 112. In a basic configuration, server computing device 112 may include at least a processing unit and a system memory for executing computer-readable instructions. In some aspects, server computing device 112 may comprise one or more server computing devices 112 in a distributed environment (e.g., cloud-based computing environment). Server computing device 112 may provide data regarding a document 110 to and from the one or more client computing devices 102 and/or one or more other server computing devices (e.g., servicer computing devices 116A and/or 116B) via network 106, as described above. As used herein, a document 110 may include any type of content, including graphical, audio, video, formatted, markup or plain text, in any file format, including digital document applications or collaborative authoring applications for creating and editing word processing documents, spreadsheets, presentations, publications, webpages, emails, and the like.

As should be appreciated, one or more documents (e.g., documents 110B, 110C, and 110D) and/or executable instructions can be stored in one or more storage locations, e.g., storage 118, accessible to document heading detection tool 104 and/or authoring application 110. In at least some examples, the one or more documents 110A-110D can be stored in different storage locations within a distributed environment (e.g., cloud-based computing environment) that is accessible to the document heading detection tool 104 (and/or authoring application 110) over a network, e.g., network 106. In some examples, the storage 118 is managed by a server computer, e.g., server computer 116C. While shown as interfacing directly with the storage 118, the server computer 116C may alternatively access the storage 118, other server computers 112, 116A and 116B, and/or client computing devices 102A, 102B via the network 106. Server computers 112, 116A-116C may also act as additional storage locations for executable instructions and/or documents.

As indicated above, the document heading detection tool 104 can operate as a stand-alone application, interface as a tool with the authoring application 110 or be incorporated as an element of the authoring application 110; interfacing or being incorporated as an element of a document format conversion application or document format conversion tool is also possible. In certain example aspects, the authoring application 110 is a word processing application. As used herein, a word processing application enables a user to author a document. Note that "authoring" the document 110 may include creating the document, viewing the document 110 (e.g., read-only access) and/or editing the document 110 (e.g., write access for additions, deletions, formatting changes, and the like), during an authoring session.

It should be noted that, while the various aspects of the document heading detection tool 104 are described in reference to an authoring application 108 that comprises a word processing application, the document heading detection tool 104 is contemplated as interfacing with or being incorporated as an element of a different type of authoring application such as a spreadsheet application, an electronic mail application, a slide presentation application, a note taking application (e.g., productivity applications) or any other type of application in which detection of headings within textual content of a document generated with the respective application can be used. In certain example aspects, the authoring application comprises a collaborative authoring application that enables a plurality of users to coauthor a single document from multiple locations at substantially the same or similar time.

Figure 2:
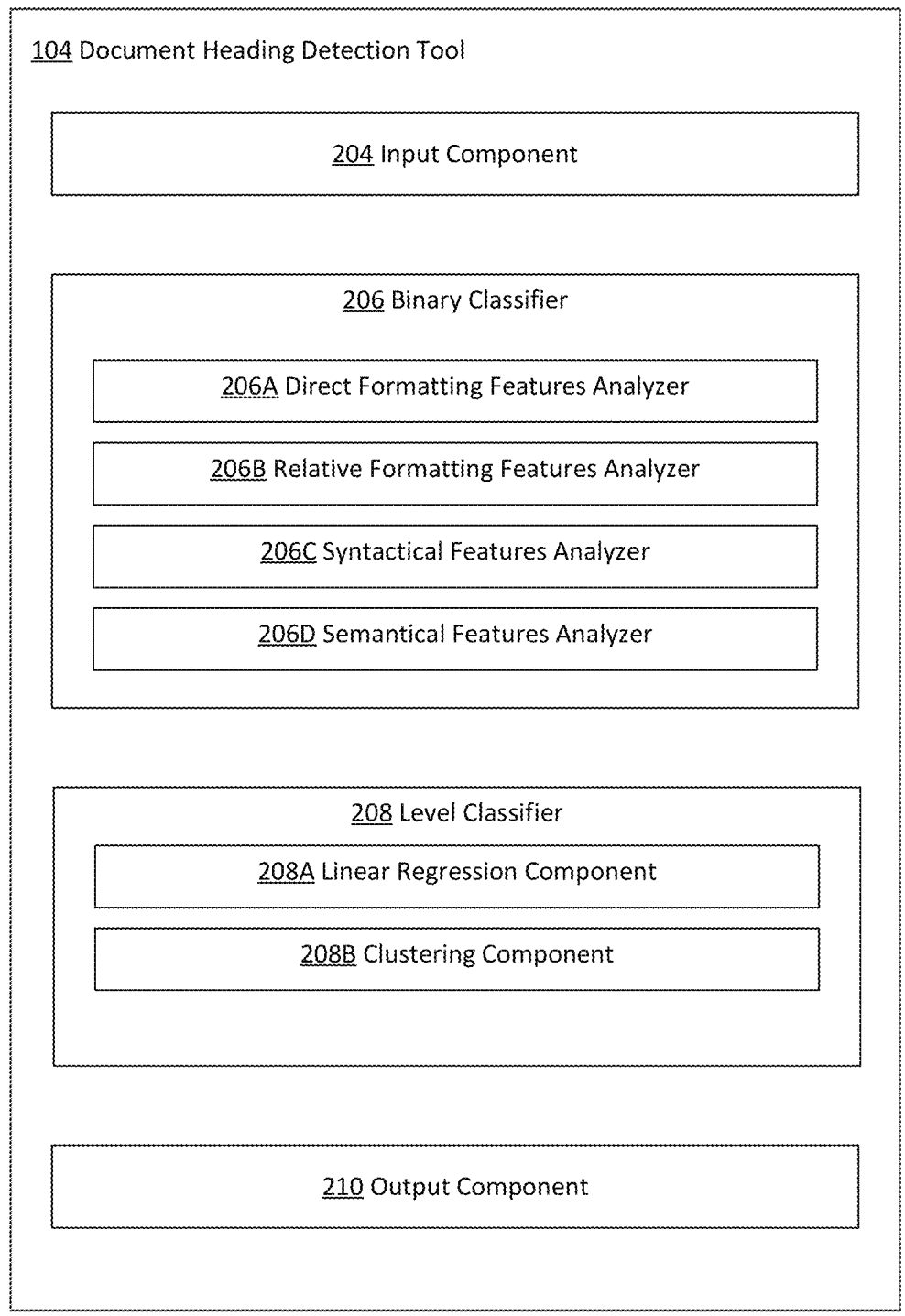
FIG. 2 is a block diagram illustrating components of a document heading detection tool.

FIG. 2 is a block diagram illustrating components of the document heading detection tool 104.

As illustrated, the document heading detection tool 104 generally includes an input component 204, a binary classifier 206, a level classifier 208 and an output component 210. The binary classifier 206 utilizes a direct formatting features analyzer 206A to analyze the direct formatting features of a paragraph (see features in Table A of FIG. 3), a relative formatting features analyzer 206B to analyze the relative formatting features of the paragraph (see features Table B of FIG. 3), a syntactical features analyzer 206C to analyze the syntactical features of the paragraph (see features in Table C of FIG. 3), and a semantical features analyzer 206D that analyzes a term frequency-inverse document frequency of the paragraph (see feature in Table D of FIG. 3). The level classifier 208 incorporates a linear regression component 208A and a clustering component 208B. The various classifiers, analyzers and components can be implemented using hardware, software or a combination of hardware and software.

The input component 204 of the document heading detection tool 104 receives the document 110, which includes textual content (words, numbers, symbols, etc.). The textual content can be pre-existing within the document 110; for example, one or more users 114 can have completed entering textual content of the document 110, and/or the textual content of the document 110 can be received on a real time basis as a user 114 is entering the textual content into the document 110 via the authoring application 108. The input component 204 provides the document 110 to the binary classifier 206.

The binary classifier 206 analyzes the various features of the textual content of the document 110 on a paragraph-by-paragraph basis and determines whether a paragraph is or is not a heading, e.g. a binary determination/output. In certain aspects, the binary classifier 206 is a boosted decision tree and that works on the scope of a single paragraph and the features of that paragraph through use of the analyzers 206A-206D.

The direct formatting features analyzer 206A of the binary classifier 206 analyzes a paragraph to provide an indication of the user's intended style for a paragraph regardless of the document type or a predefined style that may be associated with the document via an authoring application. The direct formatting features are pre-established features that have been determined as being indicative of a heading paragraph based on historical document data. Each pre-established feature is associated with a pre-established value indicative of a heading paragraph based on the historical document data. The analyzer 206A assesses the pre-established values of the pre-established features relative to a currently established value (e.g., a value greater than, lesser than or equal to the pre-established value) that reflects the pre-established feature in the paragraph under analysis to obtain an indication of whether the paragraph is a heading or a non-heading paragraph.

The pre-established direct formatting features that are considered by the direct formatting features analyzer 206A can include (with reference to Table A of FIG. 3), but are not limited to:

(A) Bold—bolding of the paragraph font;

(B) Italic—italicizing of the paragraph font;

(C) Underline—underlining of the paragraph;

(D) Uppercase—utilizing uppercase characters in the paragraph;

(E) Font Size—having a font size in the paragraph that is different from the predefined normal font of the document;

(F) Indentation—indentation of the paragraph;

(G) Outline Level—having an outline level associated with the paragraph (for example, a user has associated an outline function of the authoring application 108, such as bulleted list, a numbered list or a multi-level list, within the paragraph); and (H) Alignment—an alignment of the paragraph (for example, the user has used a center, left or right alignment function of the authoring application).

The relative formatting features analyzer 206B of the binary classifier 206 analyzes a paragraph for various features that indicate how much the paragraph stands out relative to another paragraph or relative to all paragraphs in a document. As with the direct formatting features, the relative formatting features are pre-established features that have been determined as being indicative of a heading paragraph based on historical document data. Each pre-established relative formatting feature is associated with a pre-established value indicative of a heading paragraph based on the historical document data. The analyzer 206B assesses the pre-established values of the pre-established relative formatting features relative to a currently established value (e.g., a value greater than, lesser than or equal to the pre-established value) that reflects the pre-established relative formatting feature in the paragraph under analysis to obtain an indication of whether the paragraph is a heading or a non-heading paragraph.

The relative formatting features that are considered by the relative formatting features analyzer 206B can include (with reference to Table B of FIG. 3), but are not limited to:

(A) Different Color Than Next—the present paragraph having a color different from a following paragraph;

(B) Font Size Relative to Next—the present paragraph having a font size different from a following paragraph;

(C) Normalized Font Size—a comparison of a value representative of the font size of the paragraph against values representative of the font size of each other paragraph in the document containing the paragraph (e.g., Normalized Font Size=(Current Para. Font Size Value–Minimum Font Size Value used in Document)/(Maximum Font Size Value Used in Document–Minimum Font Size Value used in Document));

(D) Indentation Compared to Next—the present paragraph having a different indentation from a following paragraph;

(E) Indentation Compared to Previous—the present paragraph having a different indentation from a previous paragraph;

(F) Normalized Indentation—a comparison of a value representative of the indentation of the paragraph against values representative of the indentation of each other paragraph in the document containing the paragraph (e.g., Normalized Indentation=(Current Para. Indentation Value–Minimum Indentation Value used in Document)/(Maximum Indentation Value Used in Document–Minimum Indentation Value used in Document))

(G) Distance to Neighbors—a value representative of the distance between the present paragraph and a neighboring paragraph (e.g., a Euclidean distance in 5-dimensional space where the dimensions are (a) bold (0 or 1); (b) italic (0 or 1); (c) underline (0 or 1); (d) AllCaps (0 or 1) and outline level (value between 1 and 9)); and/or (H) Followed by Bulleted List—the present paragraph being followed immediately below by a bulleted list.

The syntactical features analyzer 206C of the binary classifier 206 analyzes a paragraph for various syntax features (e.g. users, word usage or numbering usage) that would commonly indicate that the paragraph is a heading paragraph. As with the direct and relative formatting features, the syntactical features are pre-established features that have been determined as being indicative of a heading paragraph based on historical document data. Each pre-established feature is associated with a pre-established value indicative of a heading paragraph based on the historical document data. The analyzer 206C assesses the pre-established values of the pre-established syntactical features relative to a currently established value (e.g., a value lesser than, greater than or equal to the pre-established value) that reflects the pre-established syntactical feature in the paragraph under analysis to obtain an indication of whether the paragraph is a heading or a non-heading paragraph.

The syntactical features that are considered by the syntactical features analyzer 206C can include (with reference to Table C of FIG. 3), but are not limited to:

(A) Part of a Bulleted List—that the paragraph is an element of a bulleted list;

(B) Starts with a Number—that the paragraph starts with a number;

(C) Sentence Count—that the paragraph contains a number of sentences (e.g., a sentence count) more or less than a predetermined threshold number;

(D) Word Count—that the paragraph contains a number of words (e.g. a word count) more or less than a predetermined threshold number;

(E) Ends with a Colon—that the paragraph ends with a colon;

(F) Percentage of Non-Alphanumeric Characters—that the paragraph contains a percentage of non-alphanumeric characters more or less than a predetermined threshold percentage;

(G) Number of Tabs—that the paragraph contains a number of tabs that is more or less than a predetermined threshold number;

(H) Number of Empty Paragraphs Before—that the paragraph is preceded by a number of empty paragraphs that is more or less than a predetermined threshold number;

(I) Number of Empty Paragraphs After—that the paragraph is followed by a number of empty paragraphs that is more or less than a predetermined threshold number;

(J) Ends with Punctuation—that the paragraph does or does not end with punctuation;

(K) Text Length—that the paragraph has a text length (e.g. number of characters in the paragraph) that is more or less than a predetermined threshold length;

(L) Text Length Compared to Previous—that the paragraph has a text length that is more or less than a text length of a following paragraph; and/or (M) Text Length Compared to Next—that the paragraph has a text length that is more or less than a preceding paragraph.

As noted the pre-established features and pre-established values associated with those features are based on historical data taken from the training and testing of the document heading detection tool 104. In one instance training and testing was performed on a labeled set of existing documents. More specifically, paragraphs were labelled as headings using highlight color with different colors representing different heading levels. The labeling was added as a tool in helping to discern the intent of the document author. With labeling being consistent throughout all documents a set of rules was developed to define what parameters a paragraph must fulfill in order to be deemed a heading. For example, with regard to formatting, headings were defined as needing to stand out from regular text via specific formatting. With regard to semantics, headings were defined as needing to mark a beginning of a new content section or a new part of a document. With regard to intent, headings were defined as needing to be items/paragraphs that a user would like to find in a table of contents. The developed set of rules is reflected not only in the various pre-established features and values used but in the overall analysis performed by the binary classifier 208 and the level classifier 210.

The semantical features analyzer 206D of the binary classifier 206 determines how important words within a paragraph under analysis are and how words within a paragraph under analysis are related to subsequent paragraphs. Semantical analysis of a paragraph comprises a term frequency-inverse document frequency (tf-idf) calculation, wherein a mean value for all words in a paragraph is calculated according the following equations:

$$tf(w, p) = \frac{f_{w,p}}{N} \qquad \text{Eq. (1)}$$

Where $f_{w,p}$ is the number of occurrences of the word w in paragraph p that has N words;

$$idf(w, D) = \log\frac{N}{|\{p \in D : w \in p\}|} \qquad \text{Eq. (2)}$$

Where N is the total number of paragraphs in the document, and $|\{p \in D: w \in p\}|$ is a total number of paragraphs where the word w appears, i.e. tf(w, p)≠0; and $$tfidf(w,p,D)=tf(w,p)\cdot idf(w,D) \qquad \text{Eq. (3)}$$

Figures 4A, 4B:
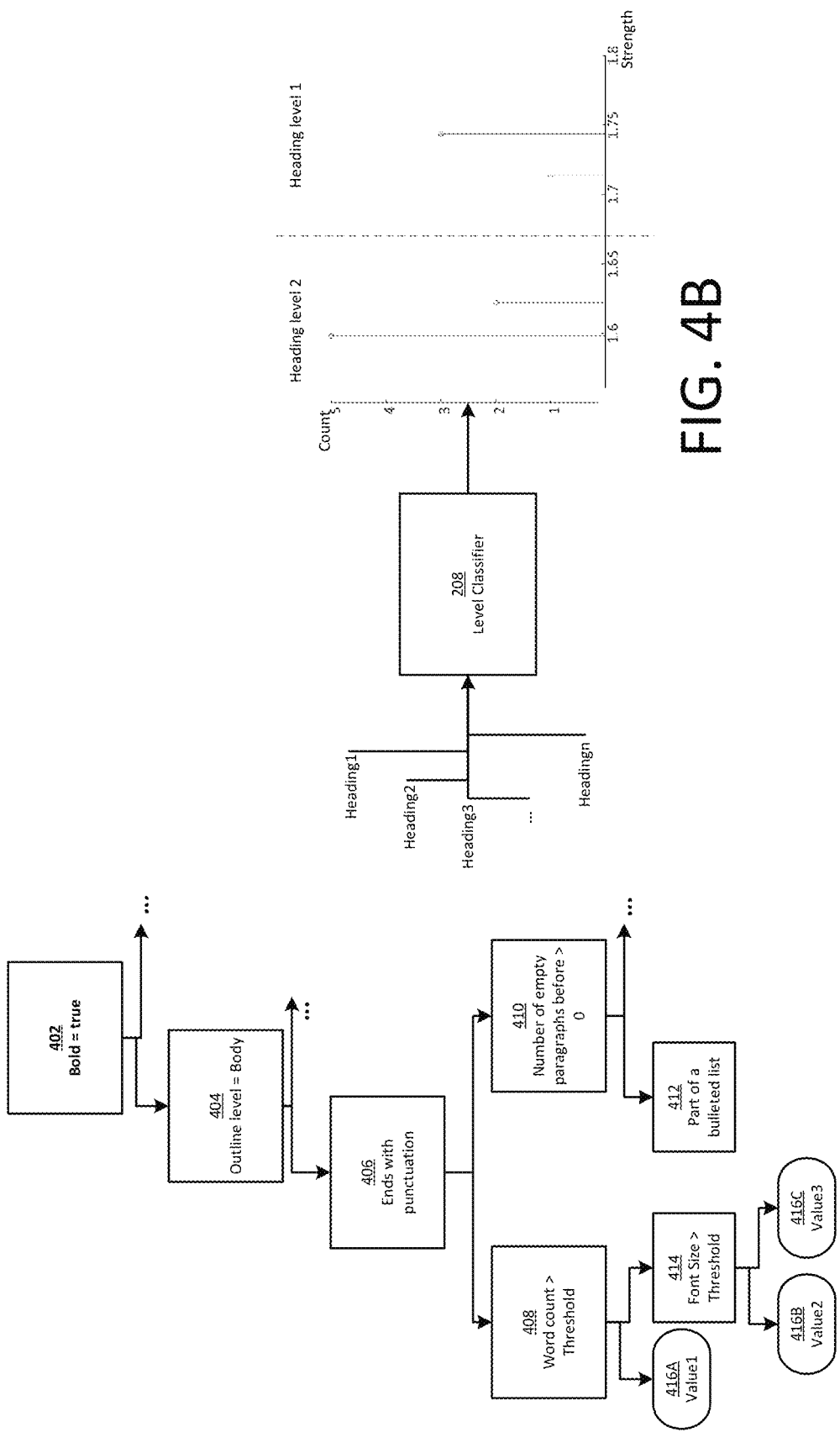
FIG. 4A-4B illustrate a simplified configuration of a binary classifier of the document heading detection tool and a simplified configuration and output of the level classifier of the document heading detection tool, respectively.

The binary classifier 206 of the document heading detection tool 104 utilizes the information provided by the direct formatting features analyzer 206A, the relative formatting features analyzer 206B, the syntactical features analyzer 206C and the semantical features analyzer 206D, to determine if the paragraph under analysis is or is not a heading paragraph. As noted earlier, in certain aspects, the binary classifier 206 is a boosted decision tree that includes value determinations for at least a portion of the various features described above. A simplified configuration of a decision tree 400 for a paragraph under analysis is illustrated in FIG. 4A. In the illustration, an analysis of the bold direct formatting feature of the paragraph is found at the top of the tree at node 402, while lower on the tree 400 an analysis of the outline direct formatting feature of the paragraph at node 404. Further nodes on the tree 400 includes analysis of the "ends with punctuation" syntactical feature at node 406, the word count syntactical feature at node 408, the "number of empty paragraphs before" syntactical feature at node 410, "part of a bulleted list" syntactical feature at node 412, font size direct formatting feature at node 414. Values resulting from, for example, the word count syntactical analysis and the font size direct formatting feature analysis are indicated at with outputs 416A-416C, corresponding to "value1," "value2," and "value3," respectively.

At least a portion of the analysis information for each of the paragraphs that is identified by the binary classifier 206 as being a heading paragraph (i.e., the "detected headings") is provided to the level classifier 208.

As noted earlier, the level classifier 208 includes a linear regression component 208A and a clustering component 208B. The linear regression component 208A performs a linear regression on the analysis information provided for each of the detected headings. The linear regression is used to reduce the dimensionality of the analyzed features so as to more easily classify specific headings into their respective heading levels. The linear regression is performed using a smaller subset of the formatting features than were used by the binary classifier 206. Based on historical data of the training and testing of the document heading detection tool 104, described earlier, the subset of features used in the linear regression have been determined to be the features that differentiate headings between different levels and, in certain aspects, are exclusively related to direct formatting features. The subset of formatting features used in the linear regression can include, but are not limited to:

(A) Bold—bolding of the paragraph font;

(B) Italic—italicizing of the paragraph font;

(C) Underline—underlining of the paragraph;

(D) Uppercase—utilizing uppercase characters in the paragraph;

(E) Normalized Font Size—a comparison of a value representative of the font size of the paragraph against values representative of the font size of each other paragraph in the document containing the paragraph (e.g., Normalized Font Size=(Current Para. Font Size Value−Minimum Font Size Value used in Document)/(Maximum Font Size Value Used in Document−Minimum Font Size Value used in Document)); and (F) Normalized Indentation—a comparison of a value representative of the indentation of the paragraph against values representative of the indentation of each other paragraph in the document containing the paragraph (e.g., Normalized Indentation=(Current Para. Indentation Value−Minimum Indentation Value used in Document)/(Maximum Indentation Value Used in Document−Minimum Indentation Value used in Document)).

The linear regression component 208A of the level classifier 208 projects each of the detected heading paragraphs from a six-dimensional space (e.g., the six formatting features of the subset) to a one-dimensional space with an output number representative of a "strength" of the detected heading. A higher "strength" value indicates a stronger heading, e.g. a first level heading, while a lower "strength" value indicates a weaker heading in a heading hierarchy (e.g., Heading 1 is stronger than Heading 2).

The clustering component 208B of the level classifier 208 then utilizes thresholding to divide the detected headings into two clusters with the detected headings in the stronger cluster being level one headings (e.g. Heading 1) and the detected heading in the weaker cluster being level two headings (e.g. Heading 2). The thresholding is performed by sliding a threshold and choosing the threshold value that results in the minimal sum of variance of the two clusters. FIG. 4B provides an example result of the output of the level classifier 208 wherein four heading paragraphs (e.g., one with a strength of ~1.6, ~1.62, ~1.72 and ~1.75) are divided into two clusters of Heading Level 1 and Heading Level 2 with a threshold strength value of ~1.67. The x-axis of FIG. 4B, labeled "Strength," represents heading strength while the y-axis of FIG. 4B, labeled "Count," represents the number of headings (e.g. heading count) that have the same strength represented on the x-axis. It should be noted that, while the description herein describes dividing the detected heading into two levels, the described systems and processes can be used for defining and dividing the detected headings into greater than two clusters and greater than two corresponding heading levels. The headings and their associated levels are stored, for example, in storage 118, for subsequent use.

As mentioned previously, the document heading detection tool 104 can be used on a document 110 in which all content has been previously entered via the authoring application 110 or can be used on a document 110 that is being edited in real time via the authoring application 110. In the instance of a document being edited in real time, the document heading detection tool 104 continuously performs the binary and level classification, and continuously updates the resultant heading levels as new paragraphs are entered into the document 110 by a user 114.

The output component 210 of the document heading detection tool 104 can provide the headings and their associated levels to the authoring application 108, wherein the authoring application 108 may use the headings and levels for various purposes. For example, the authoring application may use the headings and levels provided by the document heading detection tool 104 for converting the document 110 to a different authoring application format, for creating a table of contents for the document 110, for creating an outline of the document 110 or for creating a navigational map/outline of the document 110; other uses are also possible. In other aspects, the output component 210 of the document heading detection tool 104 itself incorporates the functionality for performing document format conversions and/or for generating a table of contents, an outline, or a navigational outline for a document; other functionality utilizing the headings and their levels are also possible.

Figure 5:
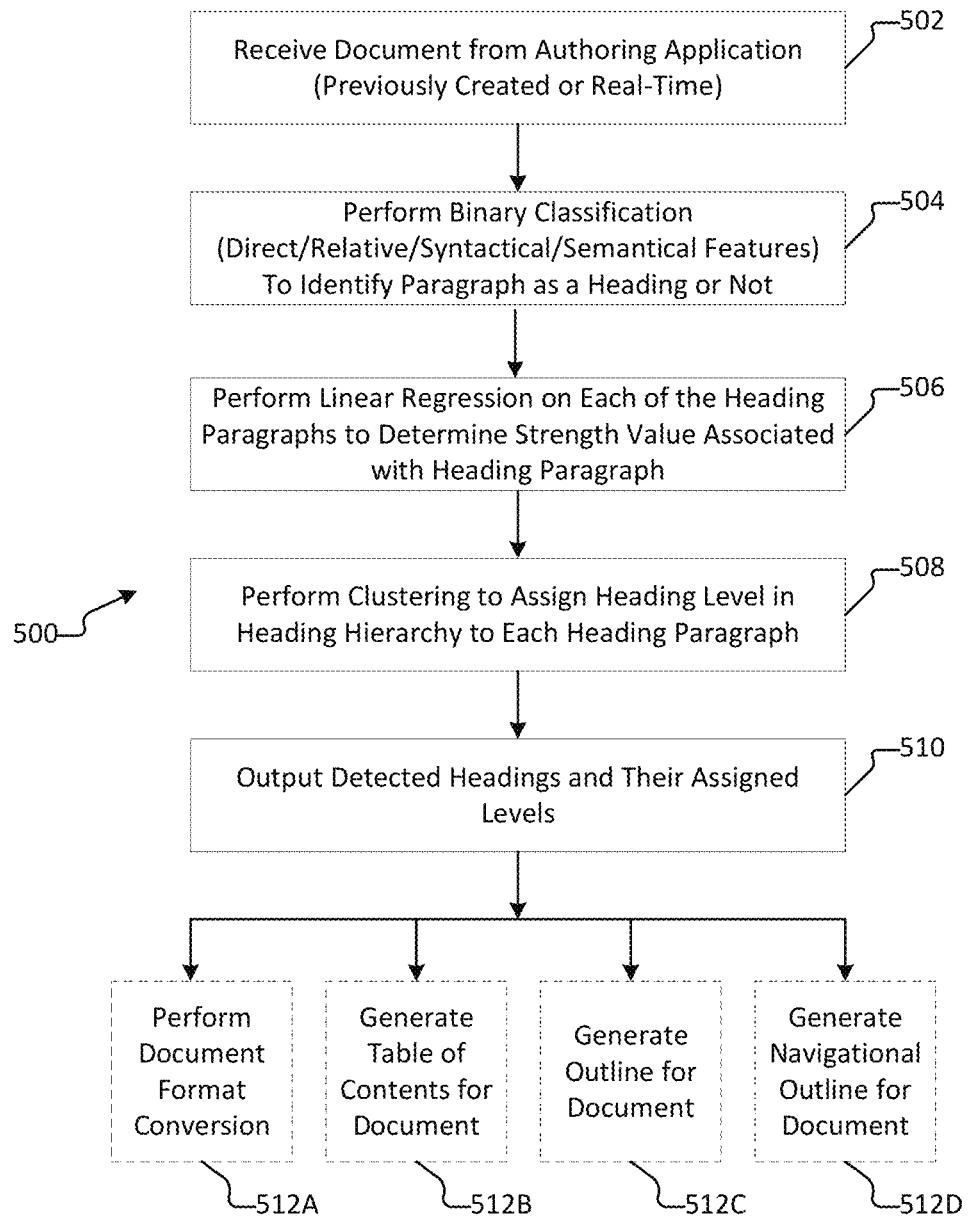
FIG. 5 is a flowchart illustrating a method of detecting headings within a document that has been created, or is being created in real time, with an authoring application.

FIG. 5 is a flowchart illustrating a method of detecting headings within a document that has been created, or is being created in real time, with an authoring application. As illustrated, a method 500 of detecting headings within a document begins with a process 502 of receiving a document from an authoring application. A process 504 of binary classification is then performed on the document on a paragraph-by-paragraph basis to analyze direct formatting features, relative formatting features, syntactical features, and semantical features of each paragraph (see features in Tables A-D of FIG. 3) to determine whether each paragraph within the document is or is not a heading paragraph.

Information obtained from the binary classification process 504 for each of the paragraphs identified as a heading paragraph is then utilized for level classification of each heading paragraph. Level classification is performed through a process 506 of linear regression and a process 508 of clustering. The process 506 of linear regression performed on each of the detected headings is based on a subset of formatting features to produce a representative strength value for each of the detected headings.

The process 508 of clustering is then performed, wherein the strength value of each detected heading is compared against one or more predetermined threshold values to assign a heading level (e.g., a cluster) to each detected heading according to a hierarchy of heading levels, e.g. a higher strength value indicating a higher heading level in the hierarchy.

A process 510 outputs the detected headings and their associated levels for use, for example, by an authoring application, a document format conversion application, or the document heading detection tool itself (the detected headings and their associated levels may also be provided to other applications/tools that may make use of them) for performance of document format conversion 512A, generation of a table of contents for the document 512B, generation of an outline of the document 512C, and/or creation of a navigational map/outline of the document 512D (other uses of the detected headings and their associated levels are also possible).

As should be appreciated, processes 502-512 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, as described herein.

Figure 6:
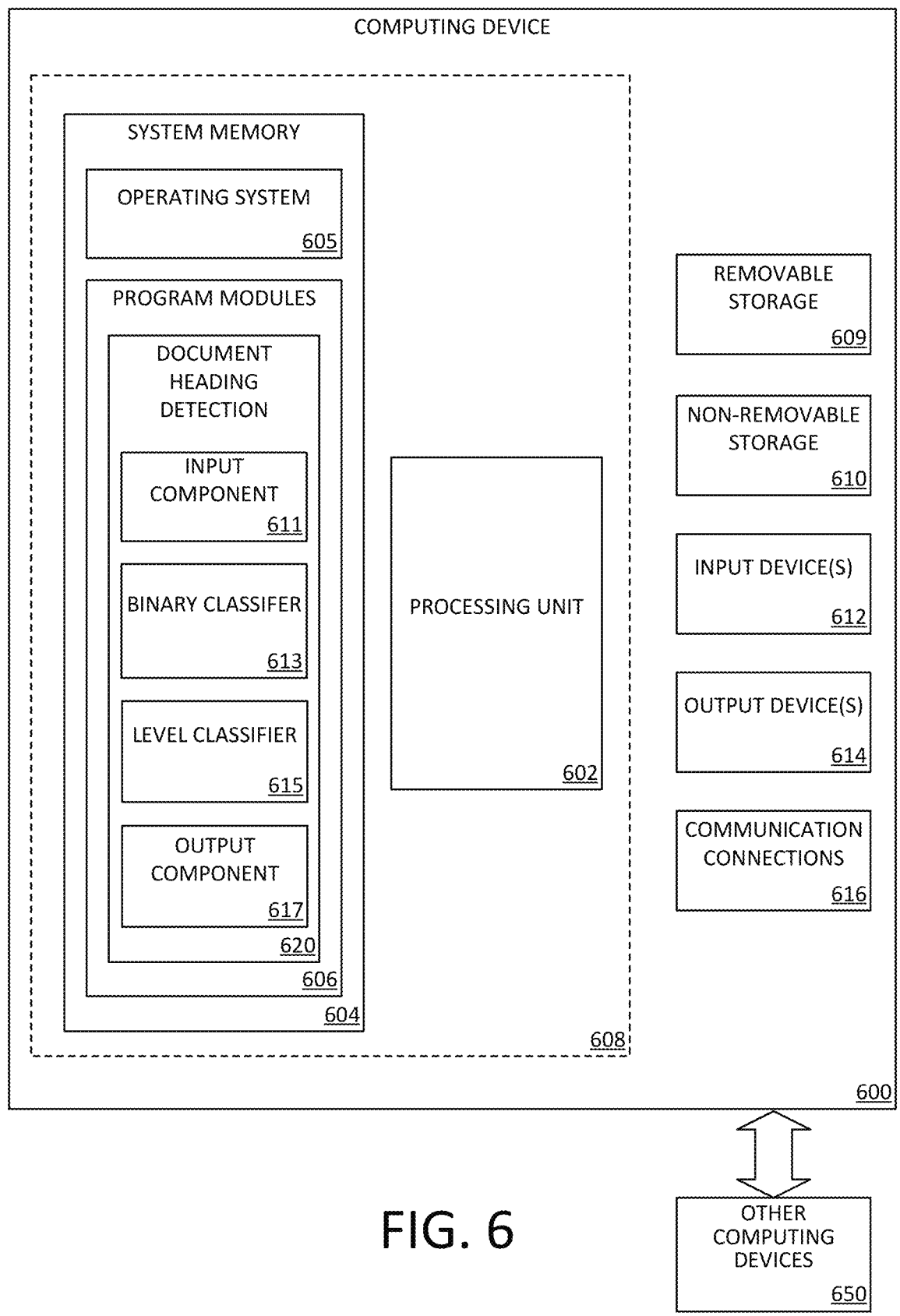
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing a document heading detection tool or application 620 on a computing device (e.g., server computing device 104), including computer executable instructions for the document heading detection application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for document heading detection application 620, such as one or more components with regard to FIG. 2 and, in particular, input component 611 (e.g., corresponding to input component 204), binary classifier 613 (e.g., corresponding to binary classifier 206), level classifier 615 (e.g., corresponding to level classifier 208), and/or output component 617 (e.g., corresponding to output component 210).

The operating system 605, for example, may be suitable for controlling the operation of the computing device 600.

Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., document heading detection application 620) may perform processes including, but not limited to, the aspects, as described herein. Other program modules that may be used in accordance with aspects of the present disclosure, and may include input component 611, binary classifier 613, level classifier 615, and/or output component 617, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of the client to switch protocols, may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
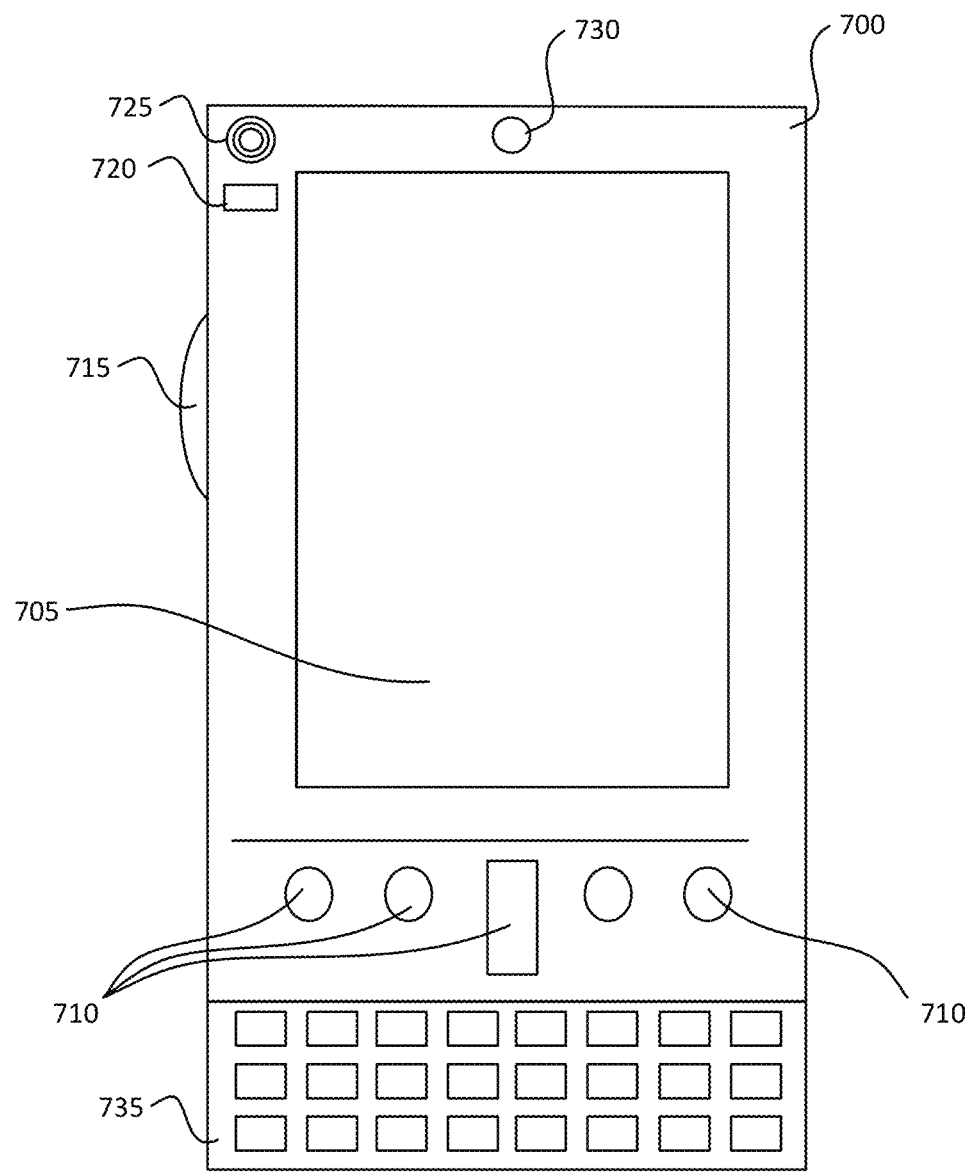
FIGS. 7A and 7B are simplified block diagrams of a mobile computing device with which aspects of the present disclosure may be practiced.
Figure 7B:
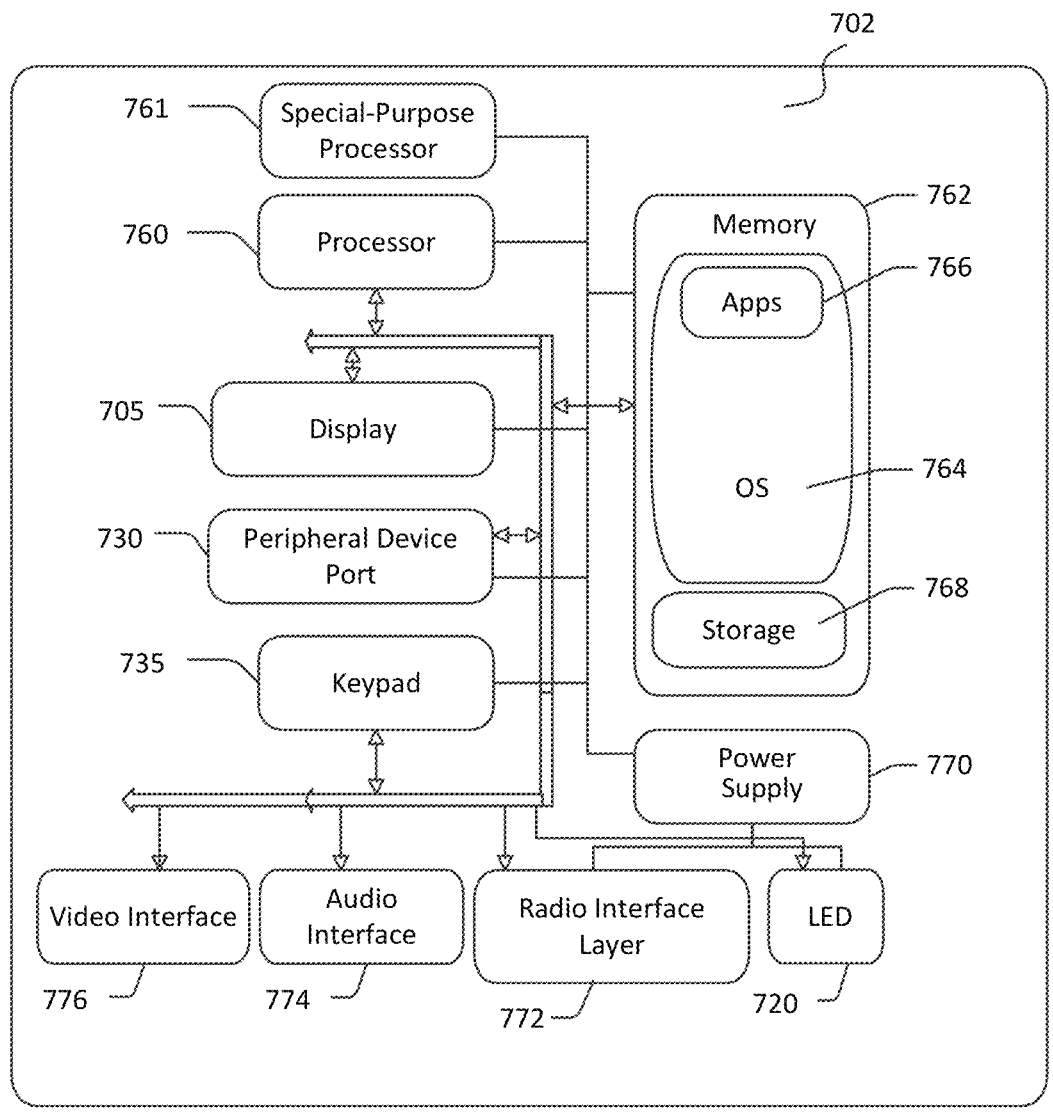

FIGS. 7A and 7B illustrate a mobile computing device 700, for example, a mobile telephone, a smart phone, wearable computer (such as a smart watch), a tablet computer, a laptop computer, and the like, with which aspects of the disclosure may be practiced. In some aspects, the client may be a mobile computing device. With reference to FIG. 7A, one aspect of a mobile computing device 700 for implementing various aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, the mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example aspect of a mobile computing device. That is, the mobile computing device 700 can incorporate a system (e.g., an architecture) 702 to implement various features and/or aspects of the present disclosure. In one aspect, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing a document heading detection application as described herein (e.g., input component, binary classifier, level classifier, output component etc.).

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated aspect, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like. Audio interface 774, video interface 776, and keyboard 735 may be operated to generate one or more messages as described herein.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and are not intended to limit the disclosure to a particular sequence of steps or a particular combination of hardware or software components.

Figure 8:
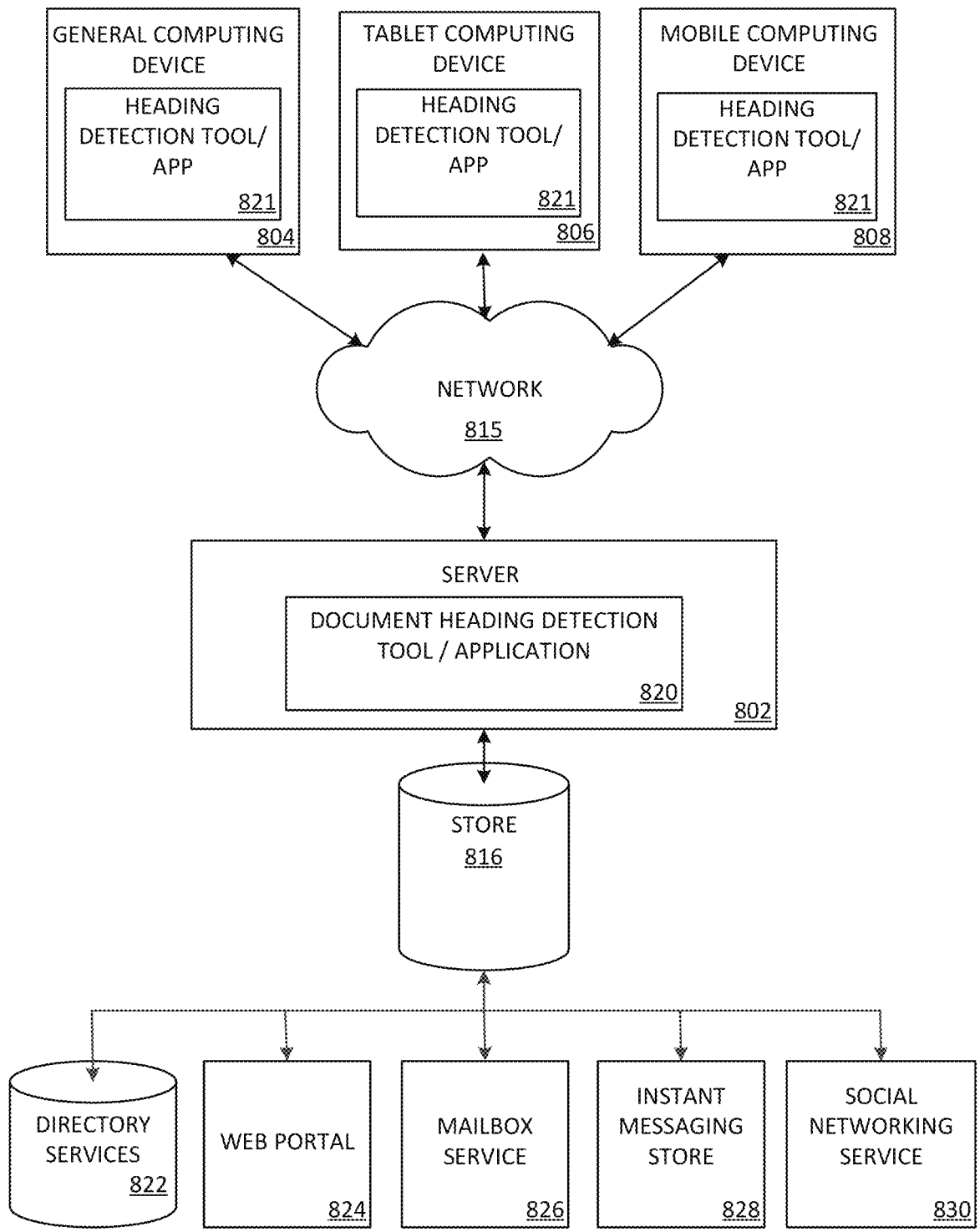
FIG. 8 is a simplified block diagram of a distributed computing system in which aspects of the present disclosure may be practiced.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802 may be stored in different communication channels or other storage types. For example, various messages may be received and/or stored using a directory service 822, a web portal 824, a mailbox service 826, an instant messaging store 828, or a social networking service 830. The document heading detection application 821 may be employed by a client that communicates with server device 802, and/or the document heading detection application 820 may be employed by server device 802. The server device 802 may provide data to and from a client computing device such as a general computing device 804, a tablet computing device 806 and/or a mobile computing device 808 (e.g., a smart phone) through a network 815. By way of example, the computer system described above with respect to FIGS. 1-5 may be embodied in a general computing device 804 (e.g., personal computer), a tablet computing device 806 and/or a mobile computing device 808 (e.g., a smart phone). Any of these aspects of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
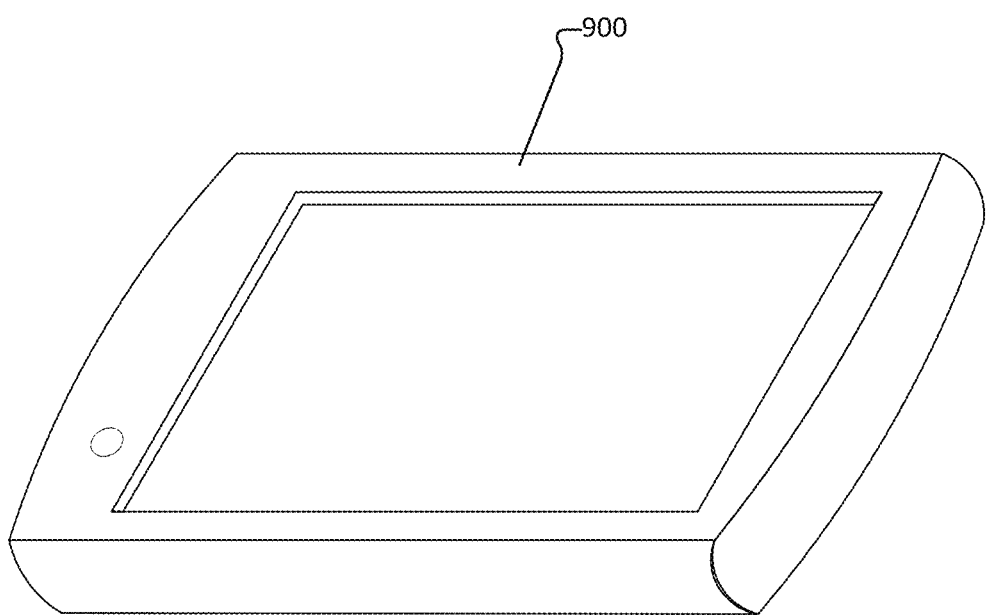
FIG. 9 is a tablet computing device for executing one or more aspects of the present disclosure.

FIG. 9 illustrates an tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed:

1. A method for detecting document headings:
   receiving a plurality of paragraphs in a document created with an authoring application, wherein each of the plurality of paragraphs includes content;
   performing a binary classification analysis on the content of each of the plurality of paragraphs to identify each paragraph as either a heading paragraph or a non-heading paragraph, the binary classification analysis assessing the content of each of the plurality of paragraphs through use of a boosted decision tree containing a plurality of content features having been pre-determined from historical content as indicative of a heading paragraph;
   performing a heading level classification for at least two paragraphs identified as heading paragraphs as being at one of a plurality of heading levels in a heading hierarchy, the heading level classification including:
   determining a strength value for the at least two paragraph identified as heading paragraphs based on a subset of the plurality of content features; and
   assigning the at least two heading paragraphs to one of the heading levels based on the determined strength value.

2. The method of claim 1, wherein the plurality of paragraphs are received in real time and wherein performing the binary classification analysis and the heading level classification are updated upon receipt of each new paragraph in real time.

3. The method of claim 1, wherein the plurality of content features includes a direct formatting feature and a relative formatting feature.

4. The method of claim 3, wherein the plurality of content features includes a syntactical feature and a semantical feature.

5. The method of claim 3, wherein the direct formatting feature includes one or more of: bold, italic, underline, uppercase, font size, indentation, outline level, or alignment.

6. The method of claim 5, wherein the relative formatting feature includes one or more of: different color than next, font size relative to next, normalized font size, indentation compared to next, indentation compared to previous, normalized indentation, distance to neighbors, or followed by bulleted list.

7. The method of claim 4, wherein the syntactical feature includes one or more of: part of a bulleted list, starts with a number, sentence count, word count, ends with a colon, percentage of non-alphanumeric characters, number of tabs, number of empty paragraphs before, number of empty paragraphs after, ends with punctuation, text length, text length compared to previous, text length compared to next.

8. The method of claim 4, wherein the semantical feature is determined using a term frequency-inverse document frequency analysis.

9. The method of claim 1, where the subset of the plurality of content features includes: bold, italic, underline, uppercase, font size and indentation.

10. The method of claim 1, wherein one or more of the plurality of paragraphs is associated with a paragraph style that is predefined by the authoring application and wherein performing the binary classification analysis and the heading level classification are performed without regard to the predefined paragraph style.

11. The method of claim 1, wherein the document has a format associated with the authoring application and wherein the method further comprises: using the one or more heading paragraphs and their assigned heading levels to perform one or more of: converting the document from the format to a different format associated with a different authoring application, generating a table of contents for the document, generating an outline for the document or generating a navigational map for the document.

12. The method of claim 1, wherein:
    determining a strength value for each of the at least two paragraphs identified as heading paragraphs includes performing a linear regression on the at least two paragraphs based on the subset of the plurality of content features.

13. The method of claim 1, wherein assigning each of the at least two heading paragraphs to one of the heading levels based on the determined strength values includes dividing the at least two heading paragraphs, using thresholding of the determined strength values, into a plurality of clusters with each of the plurality of clusters corresponding to one of the heading levels.

14. The method of claim 13, wherein thresholding of the determined strength values comprises a minimal sum variance thresholding of the determined strength values.

15. The method of claim 1, wherein each of at least a portion of the plurality of content features of the boosted decision tree are associated with a pre-determined strength value, the pre-determined strength values used in determining the strength value for each of the at least two paragraphs identified as heading paragraphs.

16. A system to detect document headings, the system comprising:
a memory storing executable instructions; and a processor, wherein when executing the executable instructions, the processor is caused to:
receive a plurality of paragraphs in a document created with an authoring application, wherein each of the plurality of paragraphs includes content;
perform a binary classification analysis on the content of each of the plurality of paragraphs to identify each paragraph as either a heading paragraph or a non-heading paragraph, the binary classification analysis assessing the content of each of the plurality of paragraphs through use of a boosted decision tree containing a plurality of content features having been pre-determined from historical content as indicative of a heading paragraph;
perform a heading level classification for at least two paragraphs identified as heading paragraphs as being at one of a plurality of heading levels in a heading hierarchy, wherein performance of the heading level classification includes:
determination of a strength value for the at least two paragraphs identified as heading paragraphs based on a subset of the plurality of content features; and
assignment of the at least two heading paragraphs to one of the heading levels based on the determined strength value.

17. The system of claim 16, wherein the plurality of paragraphs are received in real time and wherein performance of the binary classification analysis and the heading level classification is updated upon receipt of each new paragraph in real time.

18. The system of claim 16, wherein the plurality of content features includes one or more of a direct formatting feature, a relative formatting feature, a syntactical feature and a semantical feature.

19. The system of claim 16, wherein the subset of the plurality of features comprises a plurality of direct formatting features.

20. A computer storage media that stores computer-executable instructions, the instructions direct a computer to:
receive a plurality of paragraphs in a document created with an authoring application, wherein each of the plurality of paragraphs includes content;
perform a binary classification analysis on the content of each of the plurality of paragraphs to identify each paragraph as either a heading paragraph or a non-heading paragraph, the binary classification analysis assessing the content of each of the Plurality of paragraphs through use of a boosted decision tree containing a plurality of content features having been pre-determined from historical content as indicative of a heading paragraph;
perform a heading level classification for at least two paragraphs identified as heading paragraphs as being at one of a plurality of heading levels in a heading hierarchy, wherein performance of the heading level classification includes:
determination of a strength value for the at least two Paragraphs identified as heading paragraphs based on a subset of the plurality of content features; and
assign the at least two heading paragraphs to one of the heading levels based on the determined strength.

* * * * *